United States Patent

Friedman

[15] 3,651,452
[45] Mar. 21, 1972

[54] FIXED-FREQUENCY VEHICLE DETECTOR

[72] Inventor: Milton Friedman, Roslyn, Pa.

[73] Assignee: Fischer & Porter Company, Warminster, Pa.

[22] Filed: Apr. 17, 1970

[21] Appl. No.: 29,393

[52] U.S. Cl. ............................................................340/38 L
[51] Int. Cl. .........................................................G08g 1/00
[58] Field of Search...............................................340/38 L

[56] References Cited

UNITED STATES PATENTS

| | | | |
|---|---|---|---|
| 3,451,041 | 6/1969 | Marosi | 340/38 L |
| 3,493,954 | 2/1970 | Bartlett | 340/38 X L |

Primary Examiner—Ralph D. Blakeslee
Attorney—Michael Ebert

[57] ABSTRACT

A vehicle detector for sensing the presence of a vehicle and for producing a control signal to activate a traffic controller or other vehicle-responsive system associated with the detector. The detector includes an inductive loop buried in the road bed, the loop being coupled to a fixed-frequency R-F oscillator. An output signal is derived from the loop whose amplitude depends on the impedance thereof, which impedance is subject to a rapid change in value when a vehicle or other metallic mass passes in the vicinity thereof and to slow changes in value as a result of varying environmental conditions. This output signal is compared with a reference signal also derived from the loop, which reference signal has a level unaffected by said rapid change but depends on said slow changes to produce a control signal which reflects the presence of a vehicle. The control signal serves to activate the associated system.

8 Claims, 1 Drawing Figure

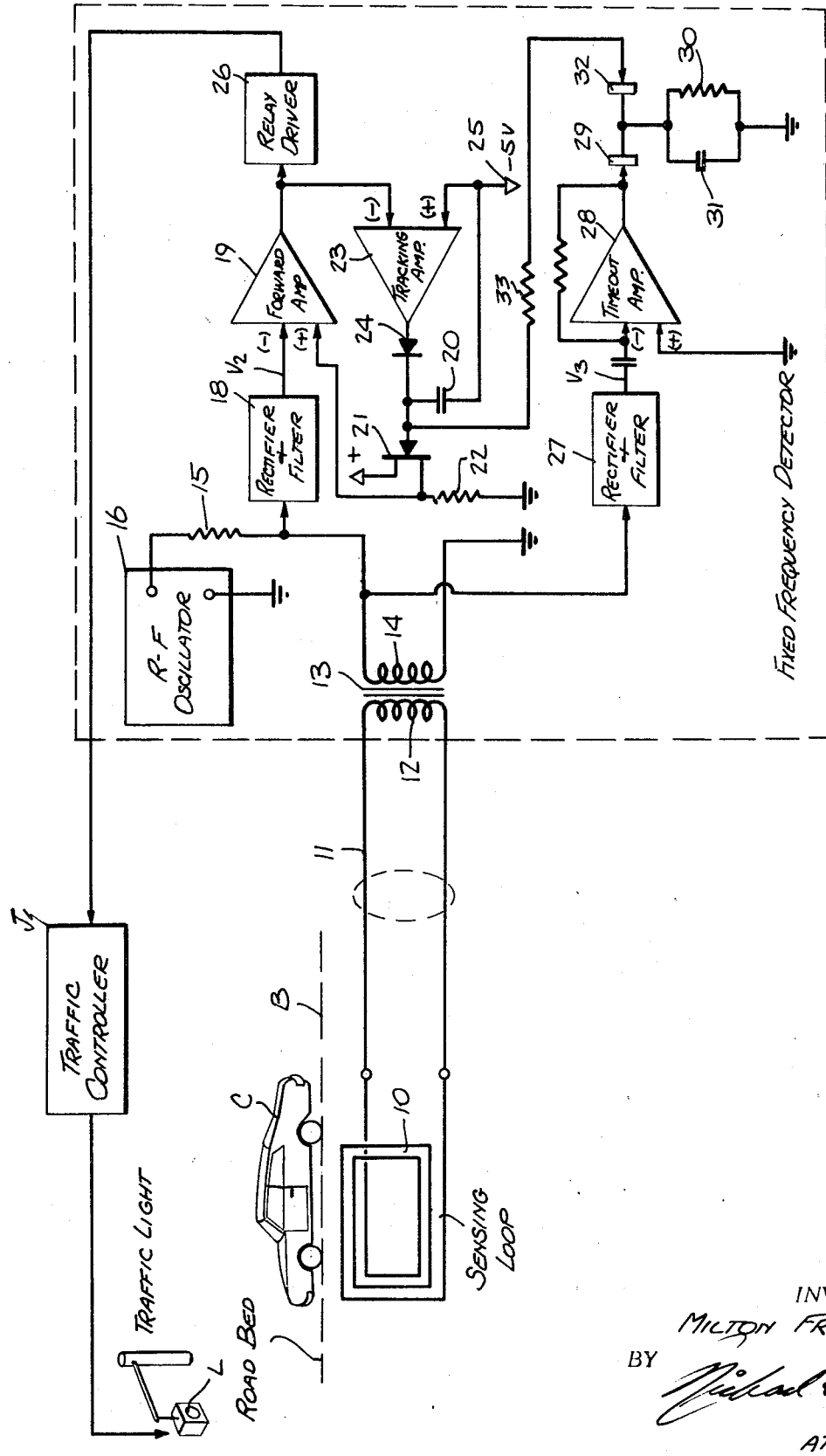

FIXED-FREQUENCY VEHICLE DETECTOR

BACKGROUND OF INVENTION

This invention relates generally to vehicle detectors, and more particularly to a detector which includes an inductive loop for sensing the presence of a vehicle.

In traffic controllers, traffic counters, parking-gate collectors and in other systems in which the presence of a vehicle is sensed to carry out control functions, vehicle detection is generally effected by means of an inductive loop buried in the vehicle passageway or road bed. The loop is energized by a high-frequency voltage, the impedance of the loop being affected by the proximity of the metallic body of the vehicle in the magnetic field of the loop.

In one known form of vehicle detector, the inductive loop is incorporated in the circuit of a high-frequency oscillator whose operating frequency depends on the loop impedance. The presence of a vehicle in the vicinity of the loop brings about a marked change in the oscillator frequency, which change is detected by a frequency or phase discriminator to produce a control signal for activating the associated system. Such vehicle detectors are hereinafter referred to as variable-frequency detectors.

The impedance of the buried loop is subject to change by reason of daily and seasonal weather conditions. Thus, variations in temperature, humidity and moisture in the ground, as well as other ambient conditions, influence the inductance and resistance of the loop as well as its shunt capacity to ground. In a variable-frequency vehicle detector, these variations in loop parameters are reflected in the frequency of the oscillator associated with the loop.

In a variable-frequency vehicle detector which has an initial frequency setting, it becomes necessary, on occasion, to retune the oscillator to take into account changes in loop parameters whereby the operating frequency of the oscillator, in the absence of a vehicle, is at the appropriate initial setting. To avoid the need for retuning, some systems include automatic tuning circuits. Such circuits are relatively complex and add to the overall cost of the system.

Another serious drawback of a variable-frequency vehicle detector is cross-modulation, which may give rise to spurious operations. Since the presence of a vehicle in the loop of one detector effects a frequency change, this frequency change may be sensed by a nearby detector if the two detection loops are sufficiently close to create transformer coupling therebetween. Thus if one variable-frequency loop detector undergoes a frequency shift in a 60 kc. to 90 kc. range and an adjacent detector responds at 70 kc., the operation of the first detector may falsely trigger the second.

In another known form of vehicle detector also making use of a wire loop embedded in the roadway, detection is based upon the phase characteristic of a parallel-tuned resonant circuit composed of a variable capacitance and the inductance provided by the buried wire loop. This tuned circuit is driven by a radiofrequency voltage which is constant in amplitude and phase. The voltage across the combination reflects the impedance characteristic of this resonant circuit. In such detectors, the change in phase of this impedance, due to the presence of a metallic vehicle, is detected by a phase discriminator to produce a control voltage to operate a relay activating the associated traffic control system.

In a phase-sensitive vehicle detector of this known type, the detector, when first installed, is adjusted to establish an initial phase relationship which is determined by the loop impedance. Should changes in impedance be encountered as a result of slow changes produced by varying environmental conditions, it is necessary to retune the loop to restore the initial phase relationship, otherwise the output will not accurately reflect the presence of vehicles which affect the phase relationship.

Another problem encountered in existing vehicle detectors arises from the presence of vehicles which remain within the sensing area for an excessive period. For example, if a vehicle detector operates a traffic control system to activate red and green traffic signals, the presence of a parked car or a disable vehicle in the vicinity of the loop will hold a traffic signal indefinitely and interfere with the proper operation of the system.

SUMMARY OF INVENTION

In view of the foregoing, the main object of this invention is to provide an efficient, reliable and low-cost fixed-frequency vehicle detector which obviates the drawbacks characteristic of existing variable-frequency detectors.

More particularly, it is an object of the invention to provide a vehicle detector wherein the presence of a vehicle which is sensed by an inductive loop brings about a change in the amplitude of a high-frequency voltage derived from a fixed-frequency oscillator without affecting the frequency thereof, the amplitude change producing a control signal to activate the system associated with the detector.

A significant feature of the fixed-frequency vehicle detector in accordance with the invention is that it is self-adjusting or self-tuning, and does not require tuning either at the time of installation or in the course of operation when changes in ambient conditions are encountered, the detector accommodating itself to wide variations in loop impedance.

Still another object of the invention is to provide a highly sensitive, fixed-frequency vehicle detector capable of detecting vehicles ranging in size from motorcycles and small cars to large trucks.

Yet another object of the invention is to provide a fixed-frequency detector of the above-described type which senses the continuous presence of a vehicle for a predetermined period, the detector resetting automatically to a non-signal condition at the expiration of the period whereby the presence of a parked car or a disabled vehicle does not impair the proper function of the system.

Briefly stated, these objects are accomplished in a vehicle detector comprising a fixed-frequency R-F oscillator which is coupled to an inductive loop or other sensor whose impedance is sensitive to the presence of a vehicle to produce an output signal whose amplitude depends on the impedance of the sensor, which impedance is subject to a rapid change in value when a vehicle or other mass is present in the vicinity of the sensor and to slow changes in value as a result of varying environmental conditions.

This output signal is compared with a reference signal also derived from the loop, the reference signal having a level unaffected by said rapid change but depending on said slow changes to produce a control signal which accurately reflects the presence of said vehicle. The control signal serves to activate the associated system.

OUTLINE OF DRAWING

For a better understanding of the invention as well as other objects and further features thereof, reference is made to the following detailed description to be read in conjunction with the accompanying drawing, whose single FIGURE schematically shows in block diagram form a fixed-frequency vehicle detector in accordance with the invention.

DESCRIPTION OF INVENTION

Structure of Detection System

Referring now to the drawing, there is shown a vehicle detector in accordance with the invention, the presence of a vehicle C having a metallic body being sensed by means of an inductive loop 10. The loop is buried under the vehicle passageway or road bed B. In practice, it may be in various dimensions, such as three coil turns in a 6-feet-by-6-feet loop, or four coil turns in a four-feet-by-four-feet loop, depending on the desired zone of detection. Instead of using an inductive loop, other forms of sensors which are sensitive to the presence of a vehicle may be used, such as a buried pressure-responsive capacitance whose electrode spacing is decreased by the presence of a vehicle to produce an impedance change.

Inductive sensing loop 10 is coupled by leads 11 to the primary winding 12 of a transformer 13 having a secondary winding 14. In practice, leads 11 may be a twisted double wire running for as much as 500 feet to the transformer. Secondary winding 14 is connected in series with a resistor 15 across the output of a fixed-frequency, R-F oscillator 16, the serially connected secondary and resistor acting as a voltage divider. Oscillator 16 may be any stable electronic circuit of conventional design. The frequency of the oscillator may, for example, be in the range of 60 to 100 kc., and be factory-set or it may be predetermined by a crystal control element.

To avoid interactions among a group of vehicle detectors in neighboring locations, each oscillator is assigned a fixed frequency position sufficiently displaced from all other frequencies as to avoid interference, taking into account possible frequency drift. Generally, a 5 kc. separation is adequate.

The R-F voltage $V_1$ developed at the junction 17 of secondary 14 and resistor 15, which is an intermediate point in the voltage divider, is applied to a rectifier and filter circuit 18 of standard design to produce a direct output voltage $V_2$ whose magnitude is proportional to the amplitude of the R-F voltage at junction 17.

When a vehicle enters sensing loop 10, the impedance of the loop is affected thereby, this change causing voltage $V_1$ at the output of the transformer secondary to drop rapidly and producing a corresponding drop in the magnitude of voltage $V_2$. Voltage $V_2$ is applied to the input (−) of a differential amplifier also having an input (+). Amplifier 19, which acts as a forward amplifier, may be any known form of solid-state differential amplifier, preferably in integrated-circuit form, having two differentially connected input stages. One input terminal is negative (−) or inverting, and the other positive (+) or non-inverting, the output being considered to have a positive polarity.

The noninverting input (+) of forward amplifier 19 receives its references voltage input from a self-tuned hold capacitor 20 through a buffer stage formed by field-effect transistor 21 and resistor 22. Capacitor 20 is connected at one end to the output of a differential tracking amplifier 23 through an isolation diode 24, the other end of capacitor 20 being connected to the noninverting input (+) of the tracking amplifier. The inverting input (−) of tracking amplifier 23 is connected to the output of forward amplifier 19. A fixed negative bias is applied to the noninverting input (+) of the tracking amplifier at terminal 25.

The output of forward amplifier 19 is connected to a relay driver stage 26, such that when the output of this amplifier increases (goes more positive), the relay is actuated to activate a traffic controller J associated therewith, which operates traffic lights L, or whatever other system is operated by the vehicle detector. The detector in accordance with the invention is operable with any existing form of traffic controller or vehicle-responsive system, and in practice the relay driver may be any electronic or electromagnetic device responsive to the output of amplifier 19 to activate the associated system.

OPERATION OF SYSTEM

When a vehicle enters sensing loop 10, the resultant drop in amplitude of R-F voltage $V_1$ produces a proportional reduction in the magnitude of direct voltage $V_2$ applied to the inverting input (−) of forward amplifier 19. As a consequence, the output of the forward amplifier, which is a control signal, increases. The control signal through relay driver 26 activates the associated control system.

The control signal through tracking amplifier 23 acts to charge the hold capacitor 20, which charge is maintained thereon, for the capacitor cannot discharge quickly through the back-biased diode 24 or through the high impedance of the field-effect transistor 21 acting as a buffer. The noninverting input (+) of the forward amplifier receives its reference voltage from capacitor 20 and this voltage remains substantially constant because of the long time constant associated with capacitor 20, buffer stage 21 and back-biased diode 24. Thus the output of forward amplifier 19 remains high to maintain relay 26 in a continuous presence output mode.

The capacitor and its associated components therefore function as a holding network which, when the presence of a vehicle is detected to produce a control signal for activating the system operated by the vehicle detector, maintains the control signal for a prolonged period.

Time-Out Circuit

In order to prevent parked cars and disabled vehicles from interfering with the operation of the system, a timeout circuit is provided so that in the case of a traffic controller in which traffic lights are controlled by the vehicle detector, a signal resulting from the presence of a parked or disabled vehicle will be wiped out after a predetermined interval, and the system returned to a non-signal condition. By way of example, we shall assume that the interval after which the timeout circuit acts automatically to restore the forward amplifier output to zero is 10 minutes. Obviously this period may be chosen to suit particular requirements.

To effect such time-out, R-F voltage $V_1$ across secondary 14 is rectified and filtered by a suitable circuit 27 and applied to the inverting input (−) of a timeout differential amplifier 28 whose noninverting input (+) is grounded, the amplifier including a differentiator providing a very high gain with respect to low frequencies. Thus when the presence of a vehicle is detected to reduce R-F voltage $V_1$, the direct voltage $V_3$ at the output of circuit 27 is reduced proportionately, and since this voltage is applied to the inverting input of amplifier 28, the positive output thereof in increased.

The output of timeout amplifier 28 is applied through a diode 29 to a resistance-capacitance network 30–31 whose time constant determines the timeout period, the value of resistor 30 (which may be adjustable) determining the leadage rate of capacitor 20. Since capacitor 31 is always charged to the positive saturation voltage of the timeout amplifier, the discharge time is essentially constant.

When sufficient charge drains out of capacitor 31, diode 32, which is connected through resistor 33 between the live end of timing capacitor 31 and the live end of hold capacitor 20, starts to conduct, for the voltage between cathode and anode of this diode is determined by the voltage difference between the two capacitors. Conduction of diode 32 causes the hold capacitor 20 to discharge rapidly through resistors 33 and 30 until the control signal output of forward amplifier 19 is driven to zero, thereby deactivating the associated relay and restoring the system to its no-signal condition.

Timing capacitor 31 is fully charged each time a vehicle enters the loop and if a car in the loop leaves before the timeout period, the circuit is restored in the manner previously described only after the predetermined interval has run out. But if the vehicle remains in the loop beyond the timeout period, the circuit is nevertheless restored after this period has expired.

Self-Tuning

The self-tuning feature of the invention serves to eliminate the need to make adjustments to compensate for changes in the impedance of sensing loop 10 by reason of variations in ambient and soil conditions affecting the loop. Initially, when the loop is first installed and connected to the detector, and line voltage is applied, the R-F voltage level $V_1$ at the secondary 14 of the transformer will be determined by the impendance of the loop in the absence of a vehicle. This in turn establishes the level of positive voltage $V_2$ applied to the inverting input (−) of the forward amplifier.

Initially, capacitor 20 has no charge. The positive voltage $V_2$ at input (−) relative to the zero voltage at input (+) is amplified by forward amplifier 19 and its output goes negative. This voltage is applied to the inverting input (−) of tracking amplifier 19, causing its output to go positive, thereby forward-biasing diode 24 and charging hold capacitor 20. The rising charge on capacitor 20 caUses the difference between the input voltages applied to forward amplifier 19 to go down.

When this differential input goes to about zero (a small offset will always remain), tracking amplifier 19 will have no input, and its output will fall below the level of the charge in hold capacitor 20, thereby back-biasing diode 24, which then isolates the capacitor and prevents further charging thereof. At this point, the self-tuning of the initial installation is complete. In practice, this process takes place in a few seconds.

The behavior of the circuit at its initial installation depends on the impedance of the loop at that time. After installation, impedance changes are experienced due to daily and seasonal weather conditions, and this is reflected in a change in the R-F level of voltage $V_1$ at the transformer secondary. If R-F voltage $V_1$ increases, then hold capacitor 20 is charged to a higher level in the same manner or previously described. When voltage $V_1$ diminishes (this decrease will occur slowly as compared to the time constants associated with capacitor 20), the leakage of charge from capacitor 20 when diode 24 is back-biased will keep the differential voltage applied to the forward amplifier at essentially zero level. It will be appreciated therefore that by charging or discharging capacitor 20, the reference voltage which is the voltage applied to the noninverting input to the forward amplifier, is adjusted automatically to compensate for changes in loop impedance.

While there has been shown and described a preferred embodiment of the invention, it will be appreciated that many changes and modifications may be made therein without, however, departing from the essential spirit and scope of the invention.

I claim:

1. A fixed-frequency vehicle detector adapted to activate an associated system when the presence of a vehicle or a metallic mass is sensed, said detector comprising:
   A. a sensor buried in the vehicle passageway, said sensor having an impedance value which is caused to undergo a rapid change when a vehicle is present in the vicinity thereof, the value of said impedance undergoing slow changes as a result of varying environmental conditions;
   B. a stable radiofrequency oscillator having a fixed frequency;
   C. means to couple said oscillator to said sensor without affecting the frequency thereof to produce an output signal whose amplitude depends on the impedance of said sensor;
   D. means to derive a reference signal from said sensor whose amplitude depends on the impedance of said sensor and has a level which is unaffected by said rapid change but which depends on said slow changes;
   E. means to compare said output signal with said reference signal to produce a control signal which accurately reflects the presence of said vehicle; and
   F. means responsive to said control signal to activate said associated system.

2. A detector as set forth in claim 1, wherein said sensor is an inductive loop.

3. A detector as set forth in claim 1, wherein said associated system is a traffic controller.

4. A detector as set forth in claim 1, further including means to maintain said control signal for a predetermined adjustable interval continuously established by a rapid reduction in sensor impedance, said interval being re-initiated every time said sensor impedance is reduced, and to thereafter reset said detector to a no-signal state.

5. A fixed-frequency vehicle detector adapted to activate an associated system when the presence of a vehicle is sensed without interference with a nearby or adjacent identical fixed-frequency vehicle detector operating at a different frequency, the detector comprising:
   A. an inductive loop adapted to be buried in a vehicle passageway whereby the presence of a vehicle in the vicinity of the loop affects the impedance of the loop, said impedance undergoing a rapid change when a vehicle is present and undergoing slow changes as a result of varying environmental conditions,
   B. a transformer having a primary and a secondary, the primary being coupled to the loop,
   C. a stable radiofrequency oscillator having a fixed frequency independent of said sensor,
   D. a voltage divider connected across the output of the oscillator and including said secondary whereby the fixed-frequency radiofrequency voltage developed at a point in the divider has an amplitude which depends on the loop impedance and thereby reflects the presence or absence of said vehicle,
   E. means to rectify said radiofrequency voltage to produce a direct signal voltage whose magnitude is proportional to the amplitude of said radiofrequency voltage,
   F. means including a charging capacitor charged by said rectified voltage to produce a reference voltage whose magnitude depends on said slow changes and is unaffected by said rapid change,
   G. means to compare said signal and reference voltages to produce a control voltage which accurately reflects the presence of said vehicle, and
   H. means responsive to said control voltage to activate said associated system.

6. A detector as set forth in claim 5 wherein said comparing means includes a differential amplifier having two inputs and one output, means to apply said direct signal voltage to one of said inputs, said capacitor being coupled to said output and being charged thereby to a level determined by the magnitude of said direct signal voltage to establish said reference voltage at the other input, whereby the output of said amplifier is said control voltage depending on the difference between the input voltages, said capacitor maintaining said control signal for an extended period determined by the time constants thereof.

7. A detector as set forth in claim 6, further including timeout means to discharge said capacitor after a predetermined interval.

8. A detector as set forth in claim 7, wherein said timeout means includes means to rectify said radiofrequency voltage to produce a control voltage, a charging circuit having a predetermined time constant, means to apply said control voltage to said charging circuit to charge same, a diode switch coupled to said capacitor network to effect discharge thereof, when the switch is rendered conductive, and means coupling said charging circuit to said diode switch to render it conductive when the charge thereon is reduced to a predetermined value.

* * * * *